Oct. 31, 1961 L. J. MOLINARO 3,006,439
HOUSING FOR SPRAY LUBRICATING SYSTEM
Filed Feb. 28, 1958 2 Sheets-Sheet 1

INVENTOR.
LAWRENCE J. MOLINARO
BY
Hyde, Meyer, Baldwin & Doran
ATTORNEYS

United States Patent Office 3,006,439
Patented Oct. 31, 1961

3,006,439
HOUSING FOR SPRAY LUBRICATING SYSTEM
Lawrence J. Molinaro, Silver Bay, Minn., assignor to Reserve Mining Company, Silver Bay, Minn., a corporation of Minnesota
Filed Feb. 28, 1958, Ser. No. 718,315
3 Claims. (Cl. 184—6)

The invention relates to a novel and improved arrangement for a spray lubrication system, and particularly to mounting and housing means for the spray lubricating elements.

In heavy mechanical assemblies having cooperating rotating gears a problem arises in connection with proper lubrication of these parts without scattering of lubricant in the immediate vicinity. The problem is greatly accentuated when spray lubrication is used.

An object of the present invention is to provide novel housing and mounting means for the injector nozzles of a spray lubricating system for supplying lubricant to intermeshed rotating gear teeth.

A further object of the invention is to provide a housing and mounting means of the character described for supporting the spray nozzles and injector blocks in operating position.

A further object of the invention is to provide housing and mounting means of the type defined in the two immediately preceding paragraphs which is hingedly mounted so that it can be swung away from the aforementioned intermeshing gears for possible servicing access to the spray nozzles while the gears are rotating.

A further object of the invention is to provide housing and mounting means as previously herein characterized, and adapted to protect the intermeshed rotatable elements from dirt, dust, or possible foreign bodies such as falling tools or the like.

Other objects and advantages will be apparent from a study of the following description of one embodiment of the invention, in conjunction with the accompanying drawings in which.

Figure 1:
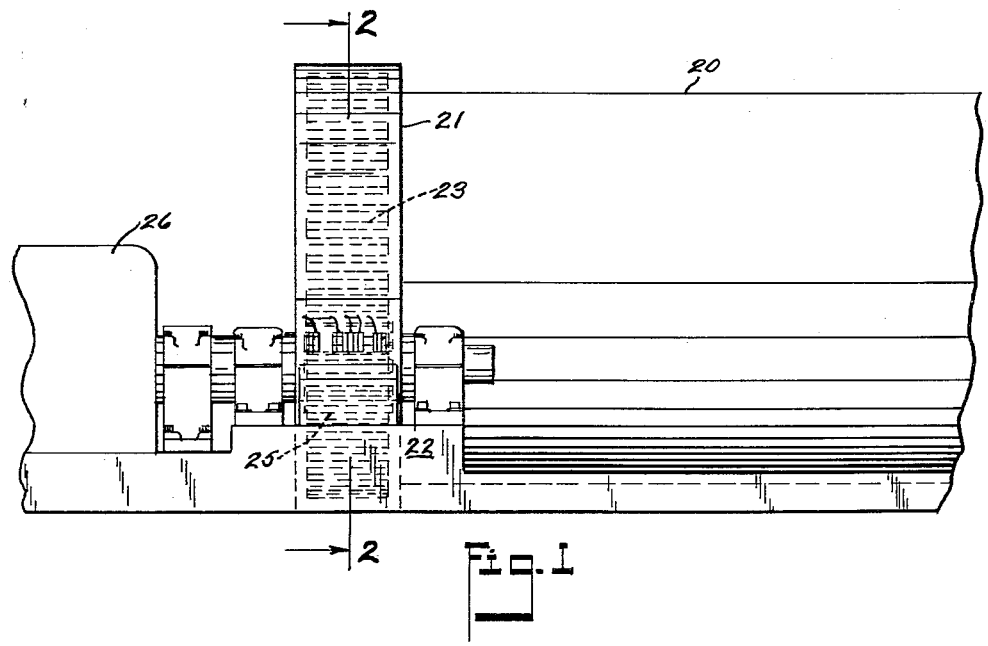
FIG. 1 is a front elevational view of a portion of an operating mechanism, showing the manner of applying my invention thereto.
Figure 2:
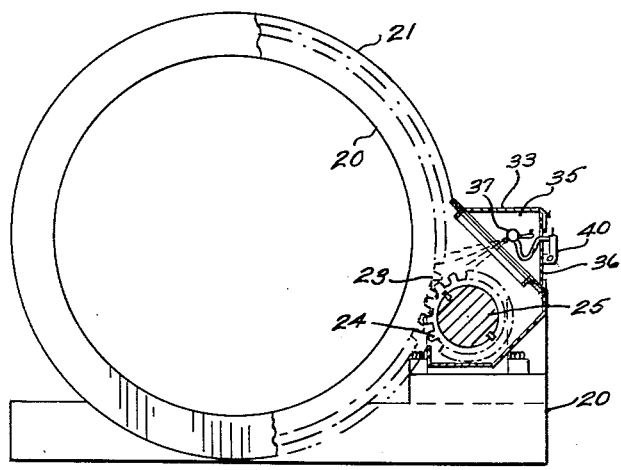
FIG. 2 is a vertical sectional view, with fragmentary portions shown in end elevation, taken on the line 2—2 of FIG. 1.

Referring first to FIGS. 1 and 2 there is shown a rotatable cylindrical drum 20 which in the present instance is a rod mill for crushing ore, but could of course be any other rotatable mechanism since its specific character is immaterial. An annular guard 21, which is fixed on a base 22, encloses a ring gear 23 fixed to drum 20. The ring gear is driven by a pinion 24 which is keyed on a shaft 25, the shaft being driven by a motor 26. These driving elements including reduction gearing, bearings, pillow block supports, etc., are conventional and need not be described in detail.

The guard 21 is provided with an enlarged portion or chamber 27 in registry with the zone of engagement of gear 23 and pinion 24, which may here be termed the lubrication zone. This chamber has an inclined front wall 28 having a door opening 29 through which the lubrication zone is rendered accessible. To provide a closure for this opening, and also a mounting means for the lubricant spray elements, I show a prismatically shaped box housing 32 hinged at 33 along its lower edge so that it can be swung to the open position of FIG. 3 from the closed position of FIGS. 2 and 4. This housing or closure has a top wall 33, side walls 34 and 35, and a front wall 36.

The side wall 35 is perforated to receive a supply pipe 37 through which a fluent lubricating compound is supplied from a flexible pipe 38. Compressed air is furnished from a flexible pipe 39 to a series of injector blocks 40, 41, 42, 43 and 44, which support respective time controlled injector valve units supported on the blocks. These valve units are obtainable commercially, and they periodically furnish jets of air through pipes 47, 48, 49, 50, 51 to the compound supply manifold pipe 37, the lubricant spray being discharged through nozzles here simply shown at *a, b, c*, etc. It will be understood that the valves, nozzles and timing system are conventional, and that the invention here involved resides in the manner of housing the spray elements.

Housing 32, as previously indicated, can be swung to fully open position for occasional inspection and servicing. For this purpose it swings on hinge 33. When moved to closed position it can be retained in any suitable way, such as by clips 52 which are perforated to receive studs 53.

Figure 5:
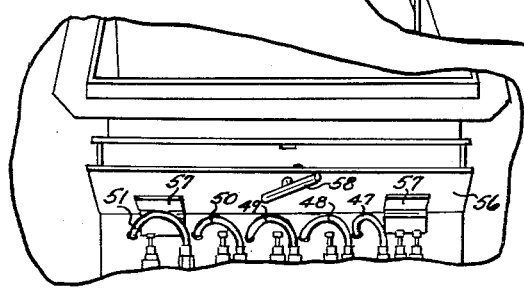
FIG. 5 is a fragmentary view, similar to the corresponding parts of FIG. 4, but showing an observation port in open position.

An observation port is provided by means of a swingable panel 56 carried along the tops of front wall 36 on hinges 57. This panel can be opened at any time by rotation of handle 58, and the spray operation may be observed. The panel is shown in open position in FIG. 5.

The arrangement just described prevents scattering of the lubricant and yet permits observation of the operation and servicing of the nozzles and supply elements. It also shields the gears from dust, dirt, or other unwanted foreign objects.

Figure 3:
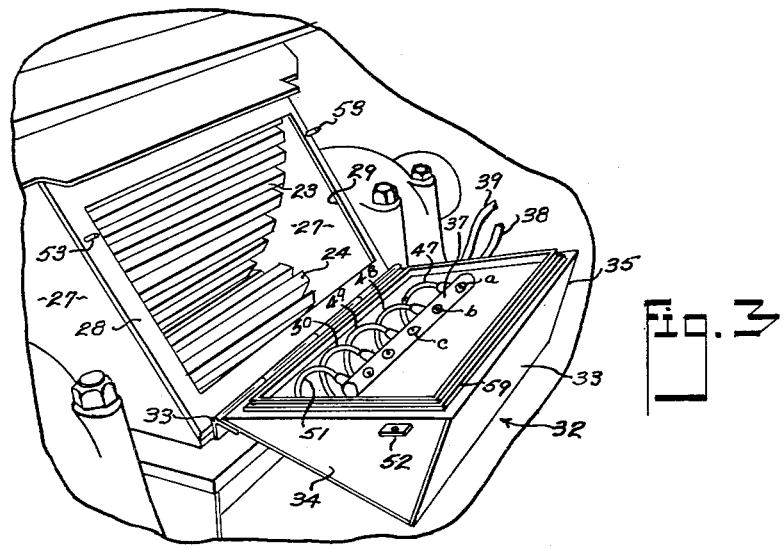
FIG. 3 is a perspective view of a housing and mounting unit carrying spray nozzles, and lubricant supplying means, the housing being shown in open position.
Figure 4:
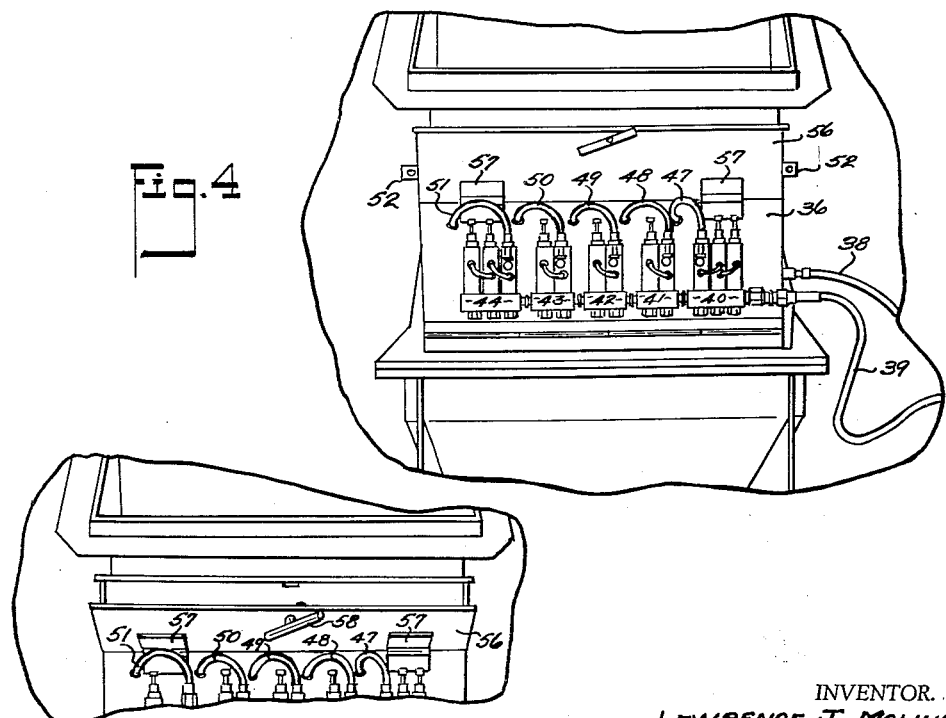
FIG. 4 is a front elevation view of the unit, showing the housing in closed condition.

A compressible gasket 59 is disposed as shown in FIG. 3, which serves as a seal and eliminates the possibility of dust or grit entering the housing. It also prevents leakage of lubricant past the seal.

What is claimed is:

1. In apparatus of the type described wherein a rotatable member is provided with an external, peripheral ring gear and with driving means consisting of a driven pinion in mesh engagement with said ring gear, means providing a spray lubrication system for the gear-pinion couple including a guard enclosure, an opening in said enclosure in operating registry with said couple, a closure member for said opening, said closure member being hinged along an edge of said opening for swinging movement outwardly and away from said couple, spray nozzle means carried on an inner face of said closure member and directed towards the intermeshing zone of said gear-pinion couple, and flexible connecting means operatively connected to said spray nozzle means for supplying lubricant and pressure fluid to said spray nozzle means.

2. Apparatus as defined in claim 1 wherein intermittent-control valve means is provided on the outer face of said closure member, and means for operatively connecting said valve means with said spray nozzle means.

3. Apparatus as defined in claim 1 wherein said closure member has a movable port cover which, when in open position, permits observation of operating conditions within the enclosure.

References Cited in the file of this patent
UNITED STATES PATENTS

| | | |
|---|---|---|
| 1,554,081 | Garrett | Sept. 15, 1925 |
| 1,790,729 | Stiffler | Feb. 3, 1931 |
| 2,038,218 | Holt | Apr. 21, 1936 |
| 2,038,803 | Olson | Apr. 28, 1936 |
| 2,214,485 | Short | Sept. 10, 1940 |
| 2,228,322 | Miller | Jan. 14, 1941 |
| 2,721,566 | Brucker | Oct. 25, 1955 |